Figure 1:
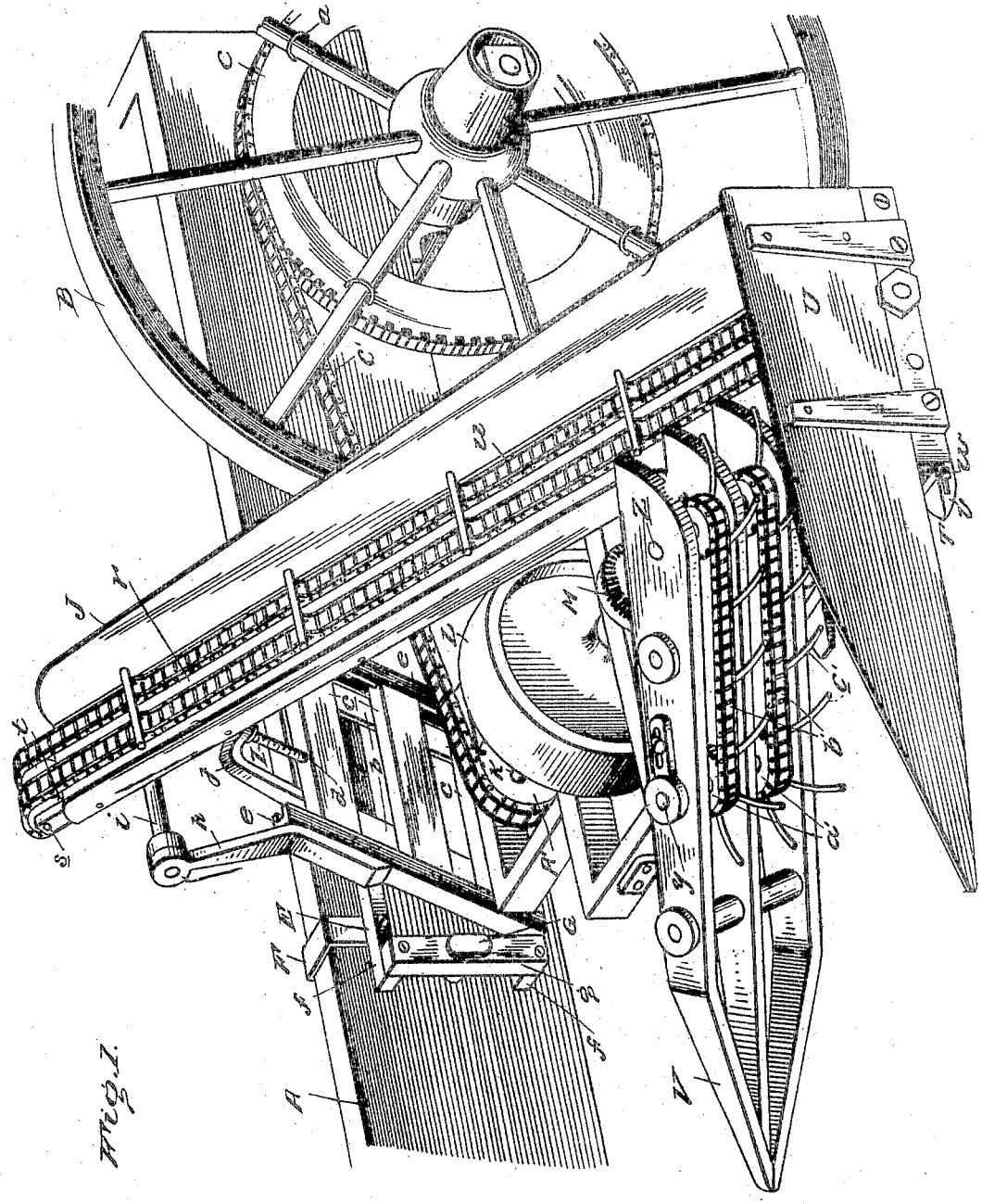

No. 797,701. PATENTED AUG. 22, 1905.
R. C. MONROE.
HARVESTER.
APPLICATION FILED APR. 24, 1905.

2 SHEETS—SHEET 1.

Witnesses
J. R. Thomas
N. E. Healy

Inventor
R. C. Monroe.
By James J. Sheehy
Attorney

No. 797,701. PATENTED AUG. 22, 1905.
R. C. MONROE.
HARVESTER.
APPLICATION FILED APR. 24, 1905.
2 SHEETS—SHEET 2.
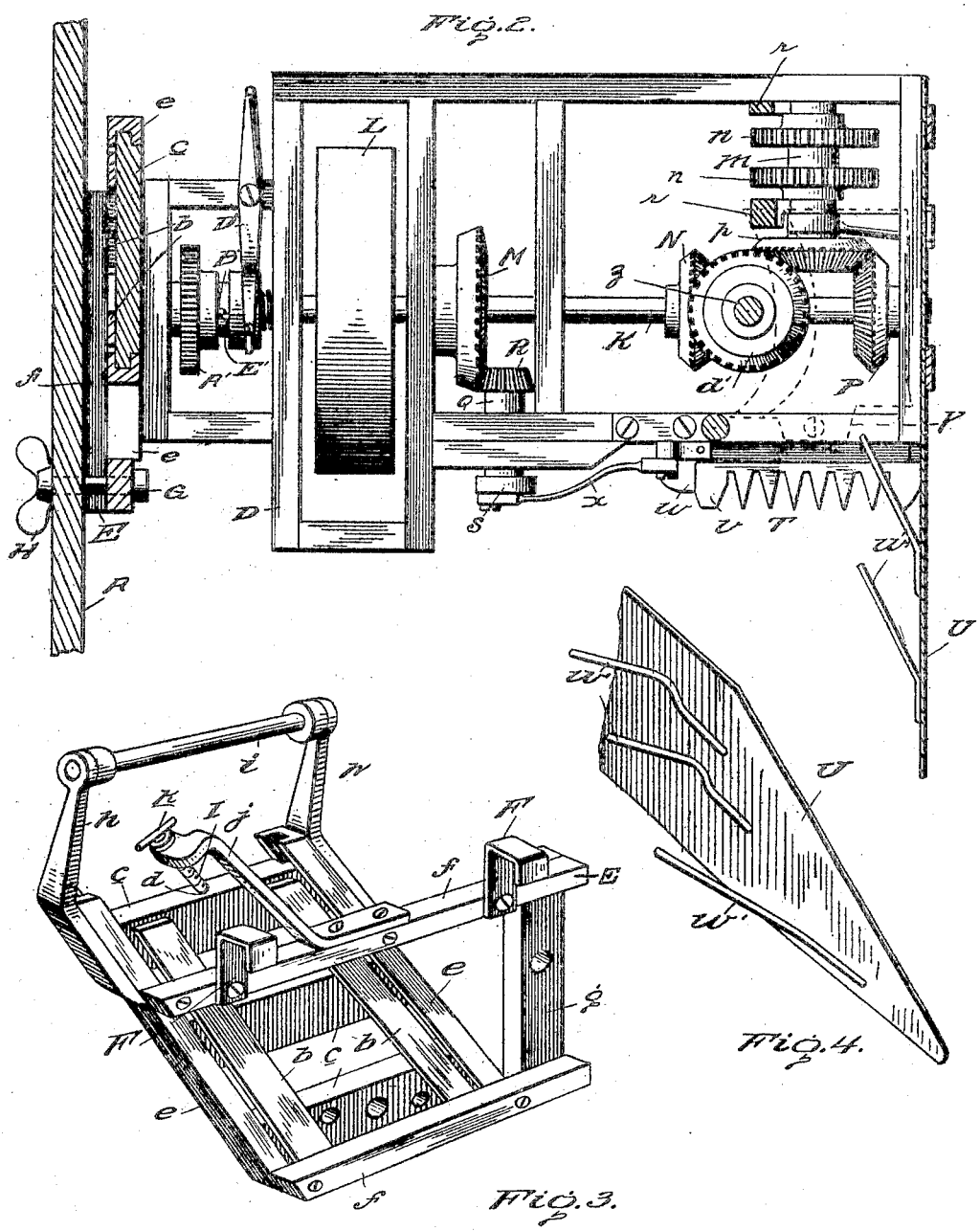
Witnesses
G. R. Thomas
N. C. Healy
Inventor
R. C. Monroe,
By James J. Sheehy
Attorney

UNITED STATES PATENT OFFICE.

ROBERT C. MONROE, OF ROSWELL, TERRITORY OF NEW MEXICO.

HARVESTER.

No. 797,701.   Specification of Letters Patent.   Patented Aug. 22, 1905.

Application filed April 24, 1905. Serial No. 257,276.

*To all whom it may concern:*

Be it known that I, ROBERT C. MONROE, a citizen of the United States, residing at Roswell, in the county of Chaves and Territory of New Mexico, have invented new and useful Improvements in Harvesters, of which the following is a specification.

My invention pertains to harvesters, more particularly to the kind of harvesters known as "Kafir-corn headers;" and it has for its object to provide a simple and practical harvester for removing the heads from Kafir-corn stalks and conveying the same to a wagon-body and one which is susceptible of being quickly and easily connected to a wagon-body and is adapted to derive motion for its working parts from one of the wheels of the wagon without involving any change whatsoever in the body of the wagon or the wheel thereof.

Other objects and advantages will be fully understood from the following description and claims when taken in connection with the accompanying drawings, forming part of this specification, in which—

Figure 1 is a perspective view illustrating the harvester constituting the present and preferred embodiment of my invention as properly arranged relative to the wagon by which it is carried. Fig. 2 is a horizontal section of the harvester, illustrating the driving connections comprised therein. Fig. 3 is a detail perspective view illustrative of the means for adjusting and adjustably fixing the frame of the harvester, and Fig. 4 is a detail perspective view showing the construction of the outer bar of the corn-gathering means of the harvester.

Similar letters designate corresponding parts in all of the views of the drawings, referring to which—

A is the body of a wagon, and B is one of the rear wheels thereof, the wheel shown being that at the left side of the body. To the spokes of the said wheel B is connected, through the medium of shackles $a$ or other suitable means, an annular sprocket-gear C, which is designed to serve a purpose presently described.

D is the main frame of my novel harvester, which is designed to rest in a horizontal or approximately horizontal position and extends laterally from the left side of the wagon-body A, as best shown in Fig. 1. At its inner end the said frame D is provided with an upright portion, which is preferably made up of inclined bars $b$ and horizontal bars $c$, the uppermost of the horizontal bars being provided with a threaded aperture $d$, for a purpose presently set forth.

E is a frame which is designed to be fixedly connected to the wagon-body A. This latter frame comprises inclined grooved bars $e$, which receive the ends of the bars $c$ of the main frame, horizontal bars $f$ connecting the said bars $e$ and bearing an upright bar $g$, arms $h$ fixed with respect to and extending upwardly from the bars $e$ and carrying a horizontal rod $i$, and an arm $j$ fixed to the upper of the bars $f$ and having a lateral apertured portion disposed above the uppermost bar $c$ of the main frame.

F F are hooks carried by the upper bar $f$ of the frame E and arranged to rest over the upper edge of the side wall of the wagon-body A.

G is a bolt carried by the bar $g$ of the frame E and extending through the said side wall of the wagon-body.

H is a wing or other suitable nut mounted on the bolt G and arranged at the inner side of the side wall of the wagon-body, and I is a screw journaled and held against endwise movement in the arm $j$ of frame E and bearing in the aperture $d$ of the main frame D and having a suitable handle $k$ at its upper end, Fig. 3.

The hooks F, the bolt G, and the nut H serve, as will be readily understood, to securely attach the frame E to the wagon-body A, and yet it will be noted that when it is desired to remove the harvester from the wagon-body it is simply necessary to remove the nut and bolt and lift the said frame E off of the body. The screw I is designed to enable the harvester attendant to readily raise and lower the main frame D with respect to the frame E and the wagon-body A, so as to position the working parts carried by the said main frame to the best advantage.

J is the elevator of the harvester. This elevator comprises a longitudinally-disposed shaft $m$, bearing sprocket-gears $n$, and a miter-gear $p$, a trough $r$ arranged to swing vertically on the shaft $m$ and resting on the rod $i$ of the frame E and having a bottom wall, a back wall, and a comparatively shallow front wall, as shown in Fig. 1, a shaft $s$, carried at the upper end of the said trough and bearing sprocket-gears $t$, and an apron $u$, having sprocket-belts arranged on the sprocket-gears and also having cross-bars on the said belts at intervals in the length thereof. The trough $r$ rests on the rod $i$ of frame E, as before stated, and the lower stretches of the sprocket-belts of the apron $u$ pass below said rod $i$, and hence it will be observed that when the frame D is adjusted vertically with respect to the frame E and the wagon-body A the said rod $i$ will serve to retain the upper portion of the elevator in proper position relative to the wagon-body A.

K is the main shaft of the harvester, which is journaled in the main frame D and is provided with a balance-wheel L, a miter-gear M, and miter-gears N and P, as shown in Fig. 2.

Q is a shaft journaled in the main frame D at right angles to the shaft K and having a pinion R in mesh with the gear M and also having a crank-disk S, and T is a cutting apparatus, which preferably comprises a finger-bar $v$ and a reciprocatory sickle-bar $w$, as best shown in Fig. 2. The said sickle-bar is connected through a pitman $x$ with the crank-disk S, and hence it will be observed that when the machine is in operation it (the sickle-bar) will be reciprocated at a high rate of speed. The miter-gear P of the main shaft K is intermeshed with the miter-gear $p$ of the lower elevator-shaft $m$, with the result that the endless apron of the elevator is driven from the said main shaft K.

U is the outer bar of the corn-gathering means of the harvester, and V is the inner bar of the said means. The outer bar U is fixedly connected to and extends forwardly from the outer end of the main frame D, is tapered to a point, and is provided on its inner side with a plurality of arms $w'$. These arms $w'$ extend laterally and rearwardly from the bar U and are arranged one above the other from the front to the rear, as shown in Fig. 4, and hence it will be observed that they will assist materially in guiding the cornstalks to the cutting apparatus T and will also assist the subsequent passage of the severed heads rearwardly to the lower receiving end of the elevator J. The inner bar V of the gathering means diverges slightly forward with respect to the bar U, is tapered to a point at its forward end, which is disposed in advance of the forward end of said bar U, and is provided with forward and rear vertical shafts $y$ $z$, sprocket-gears $a'$ on said shafts, sprocket-belts $b'$ arranged on said gears and carrying lateral tangs $c'$, and a miter-gear $d'$ fixed on the lower end of the shaft $z$ and intermeshed with the miter-gear N of the main shaft K. From this it follows that when the main shaft K is rotated the inner stretches of the sprocket-belts $b'$ will be moved rearwardly, with the result that the tangs $c'$ will take hold of and gather the corn into engagement with the cutting apparatus T and will afterward assist in the rearward passage of the severed heads to the elevator, and thereby effectually prevent choking of the harvester.

With a view of preventing the grain harvested from catching into the several gears in rear of the cutting apparatus T, I prefer to cover the said gears with a guard-plate Y, which is fixedly connected to the main frame D, as shown by dotted lines in Fig. 2.

A', Fig. 1, is a sprocket-gear loosely mounted on the main shaft K and having beveled lugs B' at one side. C' is a sprocket-belt connecting the sprocket-gear C and the gear A' and designed to transmit motion from the former to the latter, and D' is a spring-backed clutch member keyed on the shaft K, so as to turn therewith and move in the direction of the length thereof and having beveled lugs E', opposed to the lugs B' of the gear A'. In virtue of this construction it will be observed that when the wagon is in motion the working parts of the harvester will be driven from the wagon-wheel B and will be caused to work smoothly by the momentum gained by the balance-wheel L. In the event, however, of the wagon being suddenly stopped for any reason whatsoever it will be observed that the beveled lugs of the clutch member D' will ride past the complementary beveled lugs of the gear A', and hence the working parts of the harvester will lose their momentum gradually, and breakage of said parts will be thereby prevented, which is an important desideratum.

In the practical use of the harvester it will be observed that the bars U and V will gather the corn to the cutting apparatus T, and subsequent to the severing of the heads from the stalks the tangs of the endless belts carried by the bar V will accelerate the passage of the heads to the lower portion of the elevator-apron, which will carry the said heads upwardly and laterally and discharge the same into the wagon-body A.

It will be gathered from the foregoing that my improvements constitute a highly-efficient Kafir-corn header and one which requires but a minimum amount of attention from the wagon driver and which embodies no delicate parts such as are liable to get out of order after a short period of use.

Having described my invention, what I claim, and desire to secure by Letters Patent, is—

1. In a harvester, the combination of a wheel-supported body, a frame fixedly connected to said body and carrying a horizontal rod, a frame movable vertically in the first-mentioned frame and arranged laterally with respect thereto and the body, an adjusting-screw bearing in the first-mentioned frame and engaging and adapted to move the second-mentioned frame, an elevator carried by and arranged to swing vertically with respect to the second-mentioned frame and having its upper portion resting on the horizontal rod of the first-mentioned frame, grain-cutting means carried by the second-mentioned frame and arranged in advance of the lower portion of the elevator, and grain-gathering means carried by said second-mentioned frame and extending in advance of the grain-cutting means.

2. In a harvester, the combination of a wheel-supported body, a frame carried by and extending laterally from the said body, an elevator carried by said frame and arranged to discharge into the body, a cutting apparatus carried by the frame and arranged in advance of the lower portion of the elevator, gathering-bars connected to and extending forwardly from the frame at opposite sides of the cutting apparatus; one of said bars carrying a belt provided with tangs and the other bar having laterally and rearwardly extending arms arranged one above the other toward the rear, and means for actuating the elevator, the cutting apparatus and the belt carried by the gathering-bar.

3. In a harvester, the combination of a wheel-supported body, a sprocket-gear fixedly attached to the wheel, a frame having hooks engaging the upper edge of one side wall of said body, means connecting said frame and said wall of the body, a frame movable vertically in the first-mentioned frame and extending laterally with respect thereto and the body, means for adjusting and adjustably fixing the second-mentioned frame with respect to the first-mentioned frame, an elevator carried by the second-mentioned frame and arranged to discharge into the body, a cutting apparatus carried by the latter frame and arranged in advance of the lower portion of the elevator, gathering-bars connected to and extending forwardly from the latter frame at opposite sides of the cutting apparatus; one of said bars carrying a belt provided with tangs and the other bar having laterally and rearwardly extending arms arranged one above the other toward the rear, a main shaft journaled in the second-mentioned frame, driving connections between said main shaft and the elevator, the cutting apparatus and the belt carried by the gathering-bar, a balance-wheel carried by the main shaft, a sprocket-gear yieldingly clutched on said main shaft, and a sprocket-belt connecting the sprocket-gear on the wheel of the body and the sprocket-gear on the main shaft.

4. In a harvester, the combination of a frame, a cutting apparatus carried by the frame, gathering-bars connected to and extending forwardly from the frame, at opposite sides of the cutting apparatus; one of said bars carrying a belt provided with lateral tangs and the other bar having on its inner side laterally and rearwardly extending arms arranged one above the other toward the rear, and means for driving the belt of the first-mentioned gathering-bar.

In testimony whereof I have hereunto set my hand in presence of two subscribing witnesses.

ROBERT C. MONROE.

Witnesses:
   D. C. DAVIS,
   J. M. HOLLEY.